United States Patent
Roark et al.

(10) Patent No.: US 7,006,469 B1
(45) Date of Patent: Feb. 28, 2006

(54) COMMON CONTROL CHANNEL DYNAMIC FREQUENCY ASSIGNMENT METHOD AND PROTOCOL

(75) Inventors: Charles W. Roark, Plano, TX (US); Douglas B. Weiner, The Colony, TX (US); Andrew Cilia, Grand Paririe, TX (US); Mitchel B. Stiles, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 517 days.

(21) Appl. No.: 10/112,117

(22) Filed: Mar. 28, 2002

Related U.S. Application Data

(63) Continuation of application No. 09/153,312, filed on Sep. 15, 1998, now Pat. No. 6,404,751.

(51) Int. Cl.
*H04Q 7/00* (2006.01)

(52) U.S. Cl. ...................................... 370/330; 370/447
(58) Field of Classification Search ................ 370/330, 370/328, 329, 310, 319, 321, 326, 327, 337, 370/341, 343, 345, 431, 442, 447, 457, 461, 370/462; 455/464, 450, 452.1
See application file for complete search history.

(56) References Cited

U.S. PATENT DOCUMENTS

| | | | |
|---|---|---|---|
| 4,747,160 A | 5/1988 | Bossard | 455/33 |
| 5,351,240 A | 9/1994 | Highsmith | 370/461 |
| 5,668,610 A | 9/1997 | Bossard et al. | 348/723 |
| 5,684,799 A | 11/1997 | Bigham et al. | 370/397 |
| 5,734,589 A | 3/1998 | Kostreski et al. | 345/327 |
| 5,754,961 A | 5/1998 | Serizawa et al. | 455/517 |
| 6,032,047 A * | 2/2000 | Cerwall et al. | 455/450 |
| 6,167,058 A | 12/2000 | Ward et al. | 370/445 |
| 6,233,229 B1 * | 5/2001 | Ranta et al. | 370/330 |
| 6,243,584 B1 * | 6/2001 | O'Byrne | 455/447 |
| 6,356,540 B1 * | 3/2002 | Kojiro | 370/330 |
| 6,405,048 B1 * | 6/2002 | Haartsen | 455/464 |

FOREIGN PATENT DOCUMENTS

| | | |
|---|---|---|
| WO | WO 99/38786 | 12/1996 |
| WO | WO 97/29608 | 8/1997 |

* cited by examiner

*Primary Examiner*—Brian Nguyen
(74) *Attorney, Agent, or Firm*—Baker Botts L.L.P.

(57) ABSTRACT

A method and protocol for dynamic downstream and upstream frequency assignment in a localized microwave distribution system. Downstream frequencies can be assigned via a base station periodic broadcast of a frequency assignment table for a home common control channel in each base station downstream frequency. Customer premise equipment monitors the home common control channel for a frequency assignment message, which preferably includes a table mapping each customer premise equipment, or that equipment for which there has been no recent upstream communication. Downstream frequencies may also be assigned by a customer premise equipment request to a base station sent over a common control channel associated with an upstream frequency associated with a downstream frequency identified during a scan of downstream frequencies. A modified aloha contention algorithm is used if multiple customer premise equipment requests conflict. Upstream frequency and time slot requests are done in similar fashion, with a customer premise equipment sending a request over either common control channel of a currently assigned upstream frequency or a common control channel associated with a downstream frequency with which the customer premise equipment is associated.

21 Claims, 4 Drawing Sheets

COMMON CONTROL CHANNEL DYNAMIC FREQUENCY ASSIGNMENT METHOD AND PROTOCOL

RELATED APPLICATIONS

This application is a continuation application of U.S. application Ser. No. 09/153,312 filed Sep. 15, 1998, now U.S. Pat. No. 6,404,751 issued Jun. 11, 2002.

TECHNICAL FIELD OF THE INVENTION

The present invention generally concerns localized microwave distribution systems (LMDS). More particularly, the present invention concerns dynamic downstream and upstream frequency assignment for stations within the communication area of a base station of an LMDS.

BACKGROUND OF THE INVENTION

Point-to-multipoint localized distribution systems are known in the art. Typical systems use multiple low power node antennas, also commonly referred to as cell stations, base stations, and hub stations; which deliver wireless communication services to receiving stations in an area of coverage, e.g., "cell", defined around the node antennas. The node antennas are arranged to form partially overlapping cells. Frequency differentiation, polarization differentiation and similar techniques are used alone or in combination to prevent conflicting signals from adversely affecting communications received by receiving stations at or- near areas of overlap between adjacent node antennas and between adjacent sectors of a particular node antenna.

An interesting point-to-multipoint microwave television distribution system utilizes devices in the millimeter wave frequency band, between about 28 GHz and 300 GHz. Of particular interest is the 29 GHz band, from 27.5 to 31.3 GHz, which provides sufficient width to accommodate a number of broadband channels, avoids previously allocated terrestrial bands, avoids satellite down-link bands, permits relatively small sized antennas, and is compatible with known low-cost microwave circuit fabrication techniques.

In such a LMDS, a low power microwave base station communicates with a plurality of subscriber stations in its transmission cell. Multiple base stations are arranged in an array to extend coverage beyond a single cell. LMDS telephony and data communications from a base station typically communicate with subscriber customer premise equipment located within about 5 kilometers of the LMDS base station. Establishing and maintaining communications with customer premise equipment i.e., all equipment in customer premises connected through the LMDS wireless link, such as RF Network Interface Unit (NIU), telephones, computers, PBXs, etc., requires allocation of channels and time slots for communication of data and control information. Efficient use of available bandwidth is best realized through a dynamic frequency assignment since having fixed frequencies for particular CPE will often leave significant unused bandwidth.

Three general problems are encountered with such dynamic assignment. First, a downstream channel must be dynamically assigned to a customer premises NIU. In addition, an upstream channel and time slot must be dynamically assigned to a customer premises NIU. Finally, a manner for a customer premise to request either downstream or upstream frequency assignment must be provided.

This dynamic LMDS assignment problem remains essentially unaddressed in conventional LMDS. Mobile telephone cellular systems have one or more frequencies dedicated for requesting a downstream control frequency. This dedicated downstream frequency is separate from the data frequencies used to carry voice payload. This approach has little value for LMDS, which is based on assigning a single downstream frequency to a customer premises, with several customer premises sharing the same upstream frequency for control and transferring of telephony and data information. A further difference is that LMDS supports trunk line service while cellular does not. LMDS accordingly has a unique set of requirements for performing both dynamic downstream and upstream frequency assignment, believed to be unaddressed in known prior art techniques.

Thus, there is a need for an improved localized microwave distribution system that provides for dynamic downstream and upstream frequency assignment. It is an object of the invention to provide such an improved system.

It is a further object of the invention to provide an improved localized microwave distribution system including a method and protocol for dynamically allocating customer premise equipment to a downstream frequency based upon periodic message assignments retrieved through a scan of home common control channels.

An additional object of the invention is to provide an improved localized microwave distribution system including a method and protocol for dynamically allocating customer premise equipment to a downstream frequency via a request for downstream frequency assignment.

Another object of the invention is to provide an improved localized microwave distribution system including a method and protocol for dynamically allocating an upstream frequency and time slot to customer premise equipment.

Still another object of the invention is to provide an improved localized microwave distribution system including a method and frequency contention protocol for competing customer premise equipment to pick a common control channel for communicating either a downstream or upstream frequency request or time slot request to a base station.

A still further object of the invention is to provide an improved method and protocol for upstream burst mode applications which require upstream frequency assignment.

SUMMARY OF THE INVENTION

These and other objects are met or exceeded by the method and protocol for downstream and upstream dynamic frequency assignment, and the present contention protocol method for resolving customer premise equipment request frequency contentions. The protocol assumes there is a home common control channel (CCC) associated with each downstream frequency. The CCC contain one or more time slots used to communicate information downstream to customer premise equipment, such as upstream frequency and time slot assignments. The home CCC is equivalent to a broadcast of the CCC to any station listening to the downstream channel.

Downstream frequency may be assigned in accordance with the invention via a periodic broadcast of a frequency assignment table. A base station periodically broadcasts the frequency assignment table over the home CCC in each downstream frequency to designate the customer premise equipment (CPE) assigned to the particular downstream frequency. When a CPE is turned on it scans downstream frequencies until it finds its assigned frequency. A more preferred alternative eliminates the broadcast in favor of a request based assignment. In this approach, a CPE scans for non-video downstream frequency and uses one of the CCC associated with that downstream frequency to send a request for a downstream frequency assignment. The CCC is a shared resource, so a contention, or vie, protocol is used to resolve contentions. The vie protocol includes a modified slotted aloha protocol based on retrying a send over the shared resource at increasingly longer pseudo random times after each failed send.

Upstream assignment of the invention is similar in nature. Assignments may be broadcast periodically, or may be obtained by CPE requests messages to the base over one of the CCCs associated with its upstream frequency using the vie protocol. Additional time slots for a CPE having a time slot are requested over that CPE's assigned CCC frequency using the vie protocol.

BRIEF DESCRIPTION OF THE DRAWINGS

Other objects, features and advantages of the invention will become apparent to artisans upon reading the following detailed description, while referring to the attached drawings, in which:

FIG. 1b is a block flow diagram for the periodic broadcast downstream assignment according to the present invention;

DETAILED DESCRIPTION OF THE INVENTION

Broadly stated, the present invention is directed to a method and protocol for dynamic downstream and upstream frequency assignment in a localized microwave distribution system. Downstream frequencies can be assigned via a base station periodic broadcast of a frequency assignment table for the home common control channel in each downstream frequency. Customer premise equipment monitors the home common control channel for a frequency assignment message, which preferably includes a table mapping each customer premise equipment, or that equipment for which there has been no recent upstream communication. Downstream frequencies may also be assigned by a customer premise equipment request to a base station sent over a common control channel associated with an upstream frequency associated with a downstream frequency identified during a scan of downstream frequencies. A modified aloha contention algorithm is used if multiple customer premise equipment requests conflict. Upstream frequency and time slot requests are done in similar fashion, with a customer premise equipment sending a request over either a common control channel of a currently assigned upstream frequency or a common control channel associated with a downstream frequency with which the customer premise equipment is associated.

The method of the invention assumes that for every downstream frequency in the LMDS there is a common control channel (CCC) associated with each downstream frequency. The CCC may contain one or more time slots, and is used to communicate information downstream to customer premise equipments (CPEs). Such information may include upstream frequency and time slot assignments. The home CCC is equivalent to a broadcast of the CCC to any station listening to the downstream channel. Each upstream frequency in the LMDS has a CCC associated with it. The CCC is a shared resource between CPEs attempting to communicate upstream with a base station for control reasons, including requests for a downstream frequency assignment, upstream frequency assignment, or upstream time slot assignment. The method of the invention, as will be appreciated by artisans, accounts for potential conflicts in the shared resource and resolves conflicting attempts to request frequency assignments by a customer premise equipment using the shared resource to communicate with the associated base station.

Figure 1:
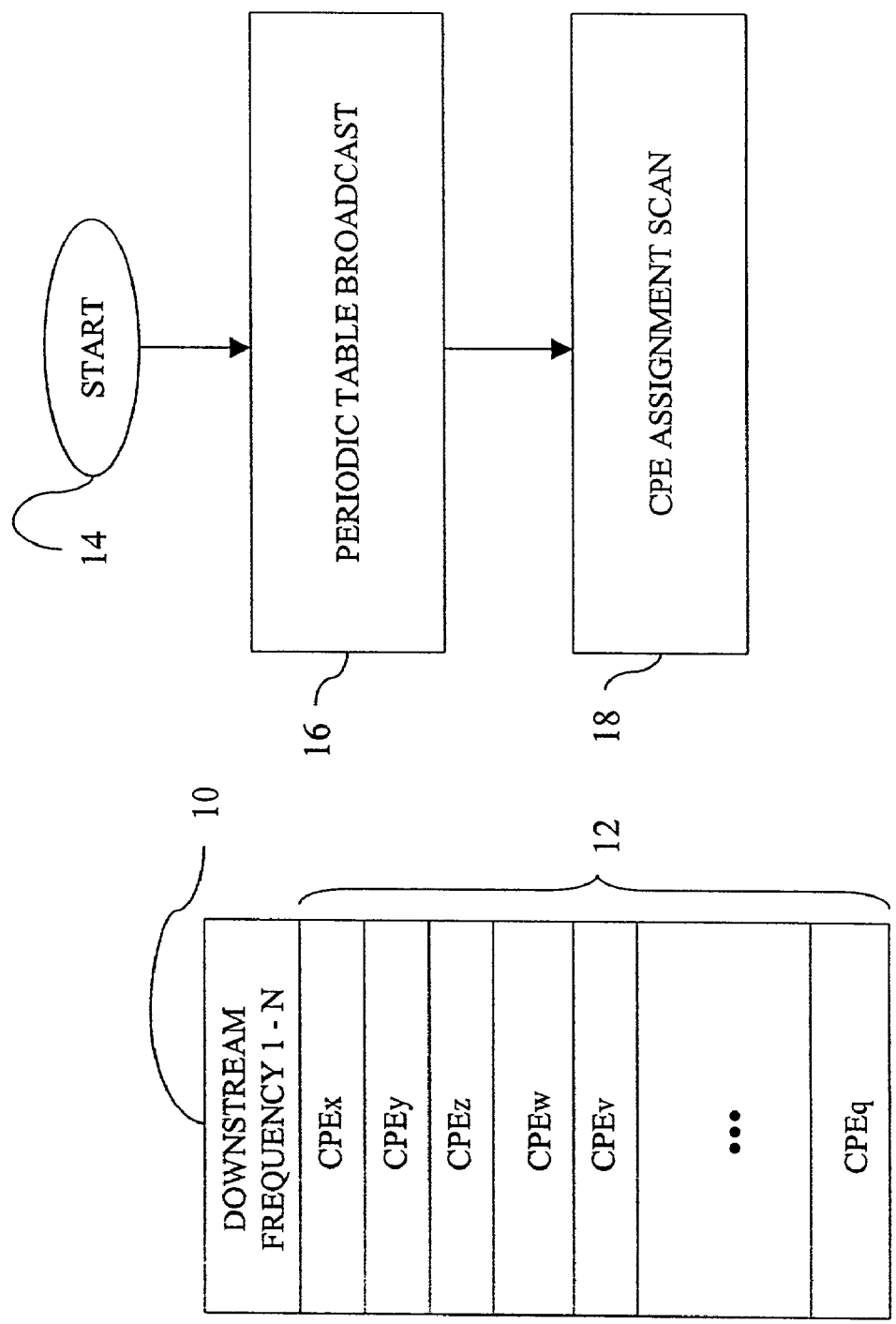
FIG. 1 a illustrates a frequency assignment table used for periodic broadcast assignment.

Referring now to FIGS. 1a and 1b, a downstream frequency assignment method and protocol of the present invention are illustrated in which a frequency assignment table 10 maps various customer premise equipment 12, i.e., CPEx-CPEq, to an available downstream frequency of an associated base station. There is a similar frequency assignment table 10 for any other available downstream frequency of the base station. Upon commencement 14 of the downstream frequency assignment, a periodic broadcast of frequency assignment tables (step 16) is conducted by the base station. The broadcast is sent out over the home CCC in each downstream frequency of the base station. This broadcast achieves a mapping through the frequency assignment table, of all CPEs to a particular one of the downstream frequencies available from the base station. Alternatively, the frequency assignment table 10 for each downstream frequency can be modified to include only those CPEs for which the base station has received no upstream communication over a predetermined time.

CPEs obtain assigned frequencies by scanning home control channels for the mapping provided by the downstream frequency assignment tables (step 18). The scan is conducted over all home common control channels in all downstream frequencies available from the base station, excepting those frequencies dedicated to video transmission. The scan of any particular CPE is completed when it finds its entry in a frequency assignment table 10, and accordingly the frequency to which it is assigned. The CPE preferably conducts the scan when it is turned on.

Figure 2:
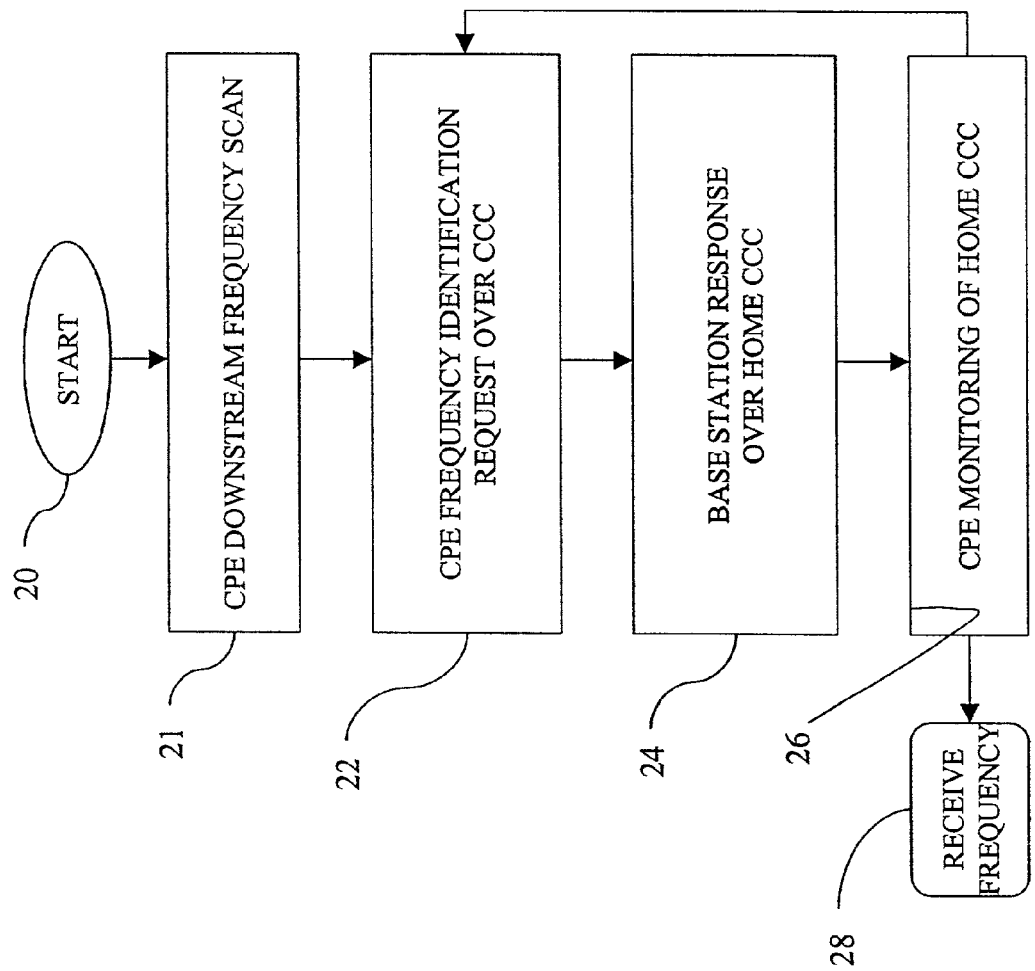
FIG. 2 is a block flow diagram for a dynamic request driven downstream frequency assignment according to the present invention.

The need to have the base station of the LMDS system conduct a periodic broadcast of assignment table messages may be avoided by a CPE request driven downstream frequency assignment method and protocol, a preferred embodiment of which is shown in FIG. 2. Upon commencement (step 20), a CPE conducts a scan for a downstream frequency (step 21). This may be at device turn-on. More specifically, the CPE request is sent over one of the CCCs associated with one of the upstream frequencies associated with the downstream frequency which it identifies. The scan is conducted for any available nonvideo downstream frequency. The CPE then identifies a downstream frequency having an available CCC over which a frequency assignment message may be sent (step 22). Essentially, this is any CCC associated with a downstream frequency through which the CPE may send a successful request message. The shared nature of the CCC may result in contentions during this step, and such contentions are resolved through the contention method and protocol illustrated in FIG. 4. A successful transmission of the downstream frequency assignment request is received by the base station, which sends a responsive frequency assignment message (step 24). The responsive frequency assignment message is sent over the home CCC of the frequency used by the CPE to send the frequency assignment request to the base station. The CPE monitors the home CCC of the frequency utilized by the CPE to send the frequency assignment request message (step 26). If a response to the message is discovered which assigns the CPE to a downstream frequency, then the downstream frequency has successfully received a frequency assignment (step 28). Otherwise, it must attempt to reidentify an available CCC over which a frequency assignment request can be sent (step 22). In the latter case, the contention protocol of FIG. 4 is implemented.

Figure 3:
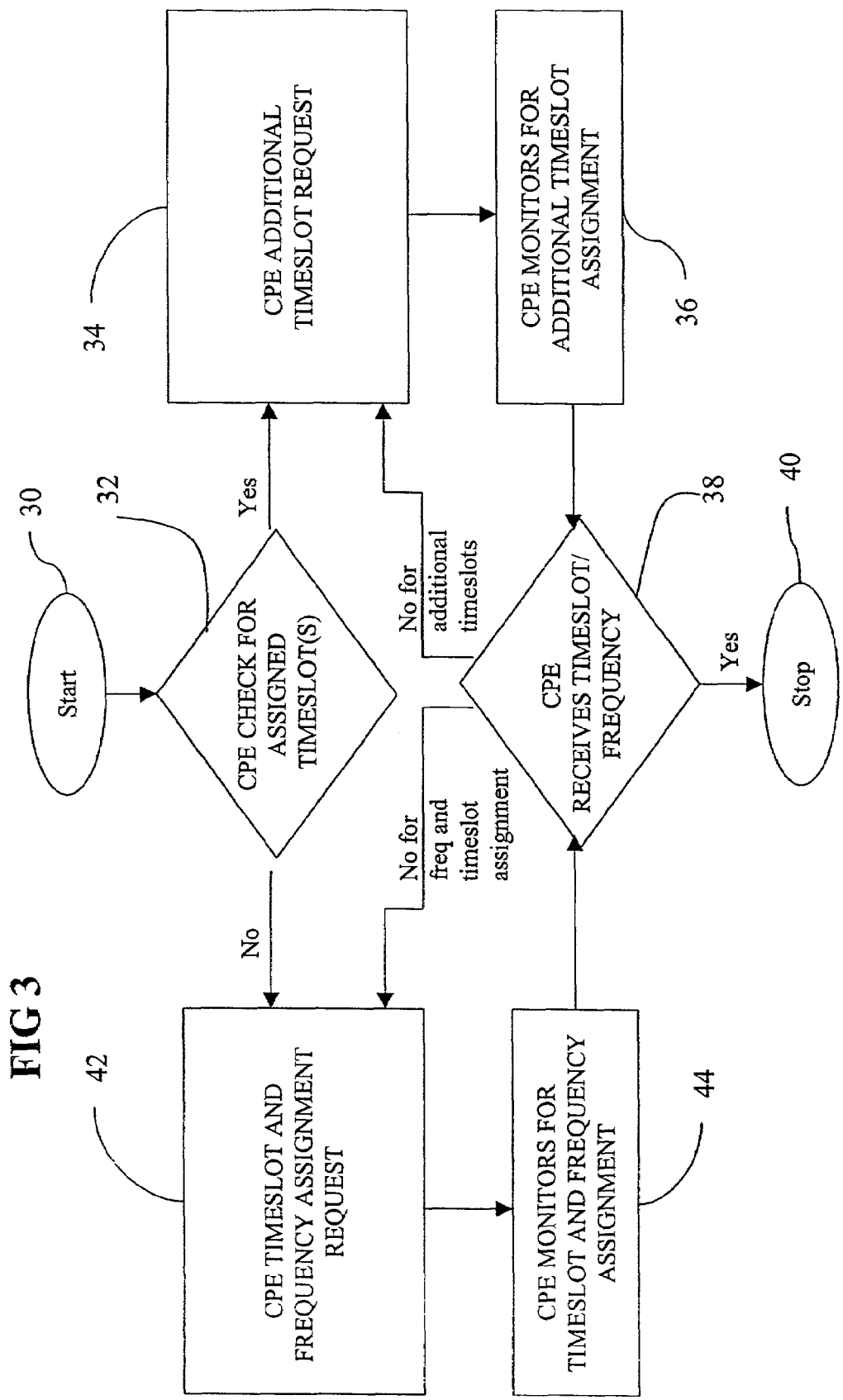
FIG. 3 is a block flow diagram for a dynamic request driven upstream frequency assignment according to the present invention.

Dynamic upstream frequency assignment is also preferably accomplished via a request driven assignment algorithm, shown generally in FIG. 3. In addition, the upstream assignment accounts for CPEs having an assigned frequency but needing additional time slot assignments. Upon commencement (step 30) the CPE determines whether it has a time slot of an upstream frequency assigned to it (step 32). A CPE having an assigned time slot to a base station upstream frequency and requiring additional time slots conducts a CPE additional time slot request (step 34). The additional time slot request is sent to the base station over the CCC associated with the CPE's assigned upstream frequency. The CPE then monitors for an additional time slot assignment message from the base station (step 36). Specifically, the CPE monitors the home CCCs associated with its downstream frequency for the additional time slot message. If the CPE receives an additional time slot assignment over the home CCC (step 38), the assignment protocol for the upstream frequency has been completed (step 40). The request for an additional time (step 34) is repeated over a frequency determined by the contention algorithm of FIG. 4 if a predetermined period of time passes before an affirmative additional time slot frequency assignment message is received.

If the initial check for assigned time slots for an upstream frequency (step 32) reveals no assigned time slot and frequency, the CPE sends a time slot and frequency assignment request to the base station (step 42). The CPE sends the time slot and frequency assignment request over the CCC associated with one of the upstream frequencies associated with the downstream frequency to which the CPE is associated. The CCC then monitors for a responsive time slot and frequency assignment message (step 44). If a suitable time slot and frequency assignment is received in the message (step 38) the upstream assignment protocol has been completed (step 40). The time slot and frequency assignment request is repeated using the contention method of FIG. 4 if either a predetermined time passes without reception of a responsive frequency and time slot assignment message or a received frequency and time slot message indicates assignment of a requested common control channel to another CPE. A time slot and frequency assignment request is sent (step 42) if a responsive frequency and time slot message is received not meeting the full requirements for number of time slots requested.

Figure 4:
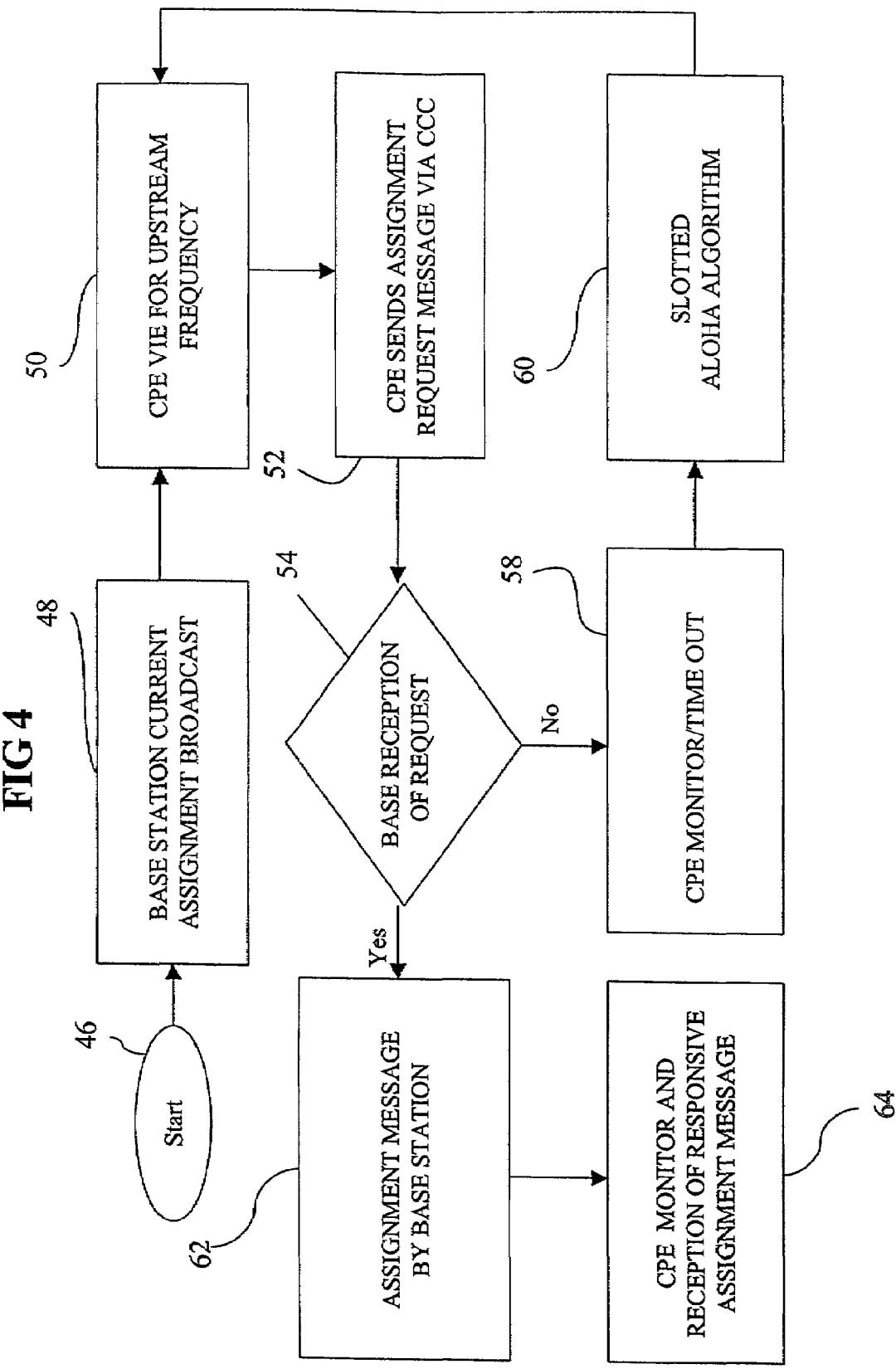
FIG. 4 is a block diagram of a vie protocol used in the downstream and upstream frequency assignment of the present invention.

Referring now to FIG. 4, the contention resolution method and protocol utilized to resolve contentions by CPEs for a shared CCC commences (step 46) with a base station current assignment broadcast (step 48). At some predetermined periodic, rate the base station broadcasts over the home CCC a message containing all current CCC assignments (step 48). Any CPE in the area of coverage for the base station requiring an upstream frequency vies for the frequency (step 50). This is accomplished through monitoring the home CCC to determine an available CCC frequency that may be used to request a frequency assignment by sending a frequency assignment request message. The assignment request message is sent over an identified available CCC to the base station (step 52). From the CPE's perspective, if the base station fails to receive the message which it sent (step 54), one of various negative events can occur to indicate the failure. Thus, the CPE monitors for a frequency assignment message, but determines (step 58) that failure has occurred if either an assignment message is received indicating that the requested CCC has been assigned to another CPE or a predetermined time passes without reception of a responsive frequency assignment message. Upon occurrence of any of these events (step 58), a conventional slotted aloha algorithm is applied (step 60) to initiate a retry of the vie for an upstream frequency (step 50) with an upstream frequency identified by the slotted aloha algorithm. The aloha algorithm (step 60) comprises retrying a send over the shared common control resource at increasingly longer pseudo random times after each failed send. In and of itself, the slotted aloha algorithm is a conventional closing detect backoff algorithm.

Successful reception of a request from a particular CPE by the base station (step 54) results in a responsive frequency assignment message being sent by the base station (step 62). The responsive upstream frequency assignment is broadcast by the base station over the home CCC and includes all remaining upstream frequency assignments in addition to the one responsive to the particular CPE request. The CPE monitors home CCC and utilizes the frequency assigned in the responsive frequency assignment message (step 64).

Thus, artisans will appreciate the dynamic assignment of the present invention permits efficient use of available LMDS base station bandwidth. While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for assigning frequency in a wireless telecommunications network, comprising:
   a base station operable to transmit a plurality of telecommunications signals over separate downstream frequencies;
   a plurality of customer premises equipment each operable to receive associated telecommunications signals from the base station over a corresponding frequency, wherein the base station includes a frequency assignment table, the frequency assignment table including a list of which downstream frequencies correspond to each customer premises equipment, the base station operable to broadcast at least a portion of the frequency assignment table to the plurality of customer premises equipment over the downstream frequencies, wherein the portion of the frequency assignment table broadcast by the base station includes only those customer premises equipment from which the base station has not received communications for a pre-determined amount of time.

2. The system of claim 1, wherein the portion of the frequency assignment table is periodically broadcast by the base station.

3. The system of claim 1, wherein the portion of the frequency assignment table is broadcast over a home control channel of each downstream frequency.

4. The system of claim 3, wherein each customer premises equipment scans the home control channel of each downstream frequency to identify its downstream frequency assignment.

5. The system of claim 4, wherein each customer premises equipment performs home control channel scanning upon activation in the wireless telecommunications network.

6. The system of claim 1, wherein a particular customer premises equipment is operable to identify one of the downstream frequencies, the particular customer premises equipment operable to send a request for a downstream frequency assignment to the base station, the request being sent over a common control channel of an upstream frequency associated with the identified downstream frequency.

7. The system of claim 6, wherein the particular customer premises equipment is operable to receive a response frequency assignment message from the base station over the identified downstream frequency.

8. The system of claim 7, wherein the response frequency assignment message is received over a home control channel of the identified downstream frequency.

9. The system of claim 6, wherein the particular customer premises equipment is operable to implement a contention protocol to resolve attempts by multiple ones of the plurality of customer premise equipment to use a same common control channel of the upstream frequency associated with the identified downstream frequency to perform sending of the request.

10. A system for assigning frequency in a wireless telecommunications network, comprising:
    means for transmitting a plurality of telecommunications signals over separate downstream frequencies to a plurality of customer premises equipment;
    means for maintaining a relationship between the separate downstream frequencies and the plurality of customer premises equipment;
    means for transmitting at least a portion of the relationship to the plurality of customer premises equipment;
    means for determining whether any communications have been received from a particular customer premises equipment over a pre-determined amount of time;
    means for transmitting only a portion of the relationship associated with the particular customer premises equipment in response to no communications being received from the particular customer premises equipment during the pre-determined amount of time.

11. The system of claim 10, further comprising:
    means for receiving a request for frequency assignment from a particular customer premises equipment on an upstream frequency;
    means for generating a response frequency assignment message;
    means for transmitting the response frequency assignment message over a downstream frequency associated with the upstream frequency.

12. The system of claim 10, further comprising:
    means for receiving a request for an additional time slot from a particular customer premises equipment on an upstream frequency;
    means for generating a response additional time slot message;
    means for transmitting the response additional time slot message over a downstream frequency associated with the upstream frequency.

13. The system of claim 10, further comprising:
    means for assigning downstream frequencies to the plurality of customer premises equipment.

14. A method for assigning frequency in a wireless telecommunications network, comprising:
    transmitting a plurality of telecommunications signals over separate downstream frequencies to a plurality of customer premises equipment;
    maintaining a relationship between the separate downstream frequencies and the plurality of customer premises equipment;
    transmitting at least a portion of the relationship to the plurality of customer premises equipment;
    determining whether any communications have been received from a particular customer premises equipment over a pre-determined amount of time;
    transmitting only a portion of the relationship associated with the particular customer premises equipment in response no communications being received from the particular customer premises equipment during the predetermined amount of time.

15. The method of claim 14, further comprising:
    receiving a request for frequency assignment from a particular customer premises equipment on an upstream frequency;
    generating a response frequency assignment message;
    transmitting the response frequency assignment message over a downstream frequency associated with the upstream frequency.

16. The method of claim 14, further comprising:
    receiving a request for an additional time slot from a particular customer premises equipment on an upstream frequency;
    generating a response additional time slot message;
    transmitting the response additional time slot message over a downstream frequency associated with the upstream frequency.

17. The method of claim 14, further comprising:
    assigning downstream frequencies to the plurality of customer premises equipment.

18. A computer readable medium including code, when executed by a processor, for assigning frequency in a wireless telecommunications network, the code operable to:
    transmit a plurality of telecommunications signals over separate downstream frequencies to a plurality of customer premises equipment;
    maintain a relationship between the separate downstream frequencies and the plurality of customer premises equipment;
    transmit at least a portion of the relationship to the plurality of customer premises equipment;
    determine whether any communications have been received from a particular customer premises equipment over a pre-determined amount of time;
    transmit only a portion of the relationship associated with the particular customer premises equipment in response to no communications being received from the particular customer premises equipment during the pre-determined period amount of time.

19. The computer readable medium of claim 18, wherein the code is further operable to:
 receive a request for frequency assignment from a particular customer premises equipment on an upstream frequency;
 generate a response frequency assignment message;
 transmit the response frequency assignment message over a downstream frequency associated with the upstream frequency.

20. The computer readable medium of claim 18, wherein the code is further operable to:
 receive an additional time slot response message over a downstream frequency associated with the upstream frequency,
 receive a request for an additional time slot from a particular customer premises equipment on an upstream frequency;
 generate a response additional time slot message;
 transmit the response additional time slot message over a downstream frequency associated with the upstream frequency.

21. The computer readable medium of claim 18, wherein the code is further operable to:
 assign downstream frequencies to the plurality of customer premises equipment.

* * * * *

UNITED STATES PATENT AND TRADEMARK OFFICE
CERTIFICATE OF CORRECTION

PATENT NO.        : 7,006,469 B1
APPLICATION NO.   : 10/112117
DATED             : February 28, 2006
INVENTOR(S)       : Charles W. Roark et al.

Page 1 of 1

It is certified that error appears in the above-identified patent and that said Letters Patent is hereby corrected as shown below:

Column 8, Lines 26-27, after "during the", delete "predetermined", and insert -- pre-determined --.

Column 9, Lines 11-14, after "operable to:", delete "receive an additional time slot response message over a downstream frequency associated with the upstream frequency,".

Signed and Sealed this

Seventeenth Day of April, 2007

JON W. DUDAS
*Director of the United States Patent and Trademark Office*